United States Patent [19]
Greenberg

[11] 3,928,518
[45] Dec. 23, 1975

[54] LOW PRESSURE INJECTION MOLDING INVOLVING MOLD FILL DETECTION

[75] Inventor: Walter H. Greenberg, Syossett, N.Y.

[73] Assignee: Beschoff Chemical Corporation, Hicksville, N.Y.

[22] Filed: Sept. 15, 1972

[21] Appl. No.: 289,415

Related U.S. Application Data
[63] Continuation of Ser. No. 28,088, April 13, 1970, abandoned.

[52] U.S. Cl. .................. 264/40; 264/50; 264/328; 264/DIG. 83; 425/4 R; 425/145
[51] Int. Cl.² ...................... B29D 27/00; B29F 1/00
[58] Field of Search ........... 264/DIG. 16, DIG. 61, 264/DIG. 65, 40, 45, 50, 51, 54, DIG. 10, 264/DIG. 83, 244, 328; 425/817, 146, 425/147, 148, 149, 145

[56] References Cited
UNITED STATES PATENTS

| | | | |
|---|---|---|---|
| 2,541,592 | 2/1951 | Lietart | 425/145 |
| 3,025,568 | 3/1962 | Hardy | 425/145 |
| 3,409,709 | 11/1968 | Cleerman | 264/40 |
| 3,543,348 | 12/1970 | Nussbaum | 264/51 |
| 3,642,404 | 2/1972 | Nagawa | 425/145 |

Primary Examiner—Philip Anderson
Attorney, Agent, or Firm—John R. Ewbank

[57] ABSTRACT

A mold is filled by low pressure injection molding with a mixture of gas and molten plastic, and the control of the quantity of the mixture sent into the mold is responsive to the filling of the mold instead of being responsive to the volume of an accumulating zone in the molding apparatus. At a plurality of positions in the mold, sensors detect the arrival of the hot plastic and as soon as the plastic has arrived at each of the sensors, a signal cuts off the flow of plastic from the large conduits into the mold.

1 Claim, 1 Drawing Figure

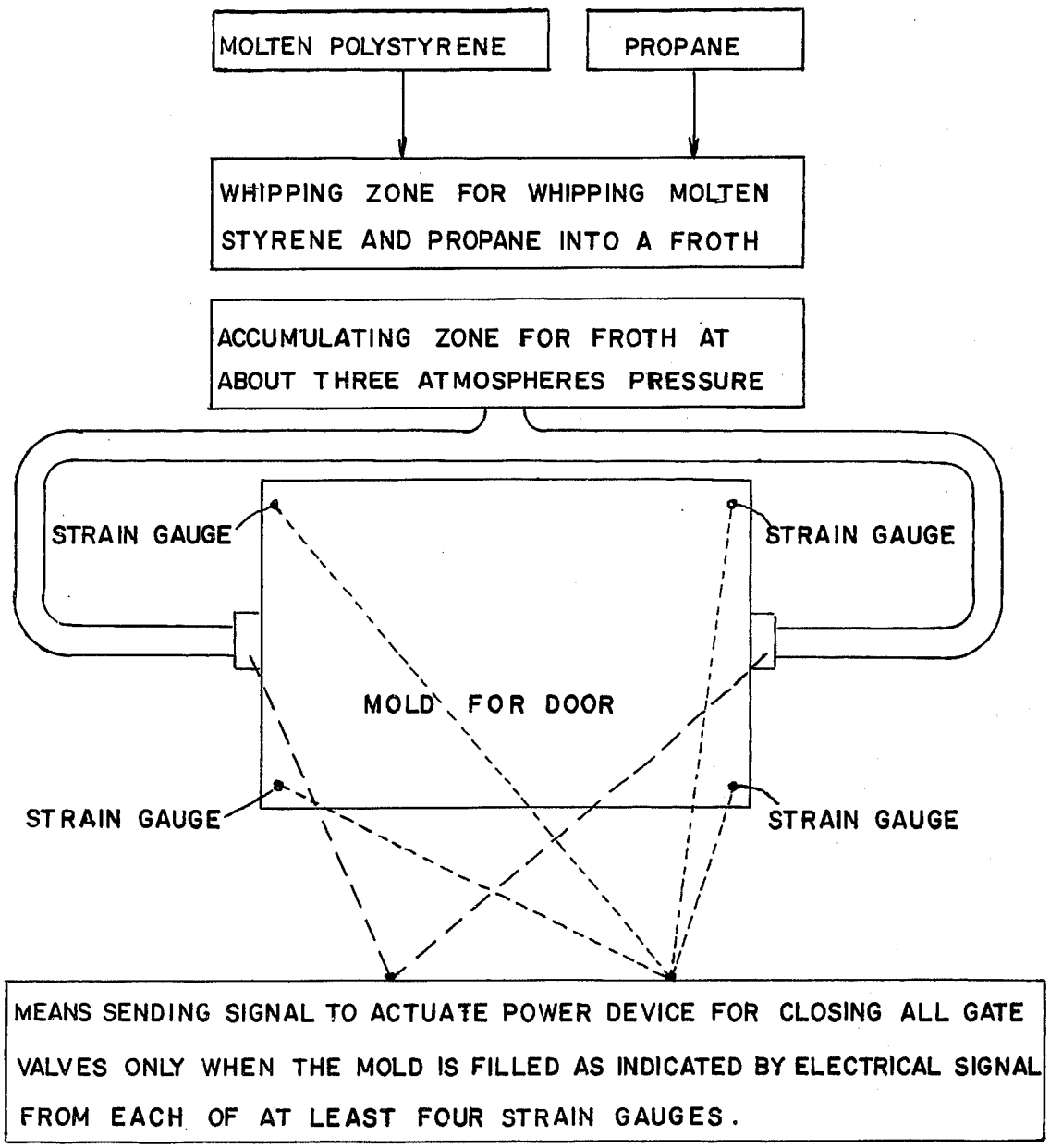

LOW PRESSURE INJECTION MOLDING INVOLVING MOLD FILL DETECTION

CROSS REFERENCE

This is a streamlined continuation of Ser. No. 28,088, filed Apr. 13, 1970, now abandoned.

GENERAL BACKGROUND OF THE INVENTION

Injection molding of macromolecular structural organic material generally requires the injection of the plastic at a very high pressure, thus necessitating very high clamping pressures and significantly limiting the cross sectional area which can be designed for the mold. In low pressure injection molding, gas cells distributed throughout the molten plastic significantly reduce the viscosity of the mixture, whereby the mold can be filled at a pressure less than required in conventional injection molding. In both systems, it has been conventional to employ an accumulating zone in which a controlled volume of composition was collected and thereafter pumped into the mold during a very brief injection period. The pressure of injection has been relied upon to achieve a complete filling of the mold, but the elasticity and compressability of the molten cellular plastic has permitted random variations in the operation. Molding of purely solid articles under high pressure has involved few complications, but the molding of gas-containing articles at high pressure has sometimes provided articles which were objectionable by reason of the gas pressure within the article. Random differences in the weights of a series of supposedly identical articles have created problems for the cellular articles resulting from some low pressure injection molding methods relying upon volumetric control of shot size.

SUMMARY OF INVENTION

In accordance with the present invention, the filling of a mold by a mixture of molten plastic and gas is allowed to continue until the sensors at each of a plurality of locations all confirm that the hot plastic has flowed to such positions, and then the flow of plastic is cut off, whereby more reliable filling of the mold in a series of repeated operations is achieved.

DRAWING

The method of the present invention is clarified by the self-explanatory flow-sheet.

DESCRIPTION OF PREFERRED EMBODIMENTS

The nature of the invention is further clarified by reference to a plurality of examples.

EXAMPLE 1

A batch of polyethylene pellets is heated in a plastisizing mill until low viscosity is attained, and then transferred to a whipping zone in which pressurized trifluorochloromethane is whipped into the molten polyethylene to provide a pressurized mixture. The mixture flows into one of a plurality of accumulating zones, which is heated and maintained at the molten plastic temperature and at a pressure less than about 5 atmospheres, that is less than about 59 psig. From the accumulating zone are a plurality of heated conduits, each having a cross section of about 225 square centimeters, and filled with the cellular mixture of molten polyethylene and trifluorochloromethane. The conduits connect the accumulating zone with a mold for a bath tub, and gate valve means are provided for cutting off the flow of plastic at the entrance to the mold. At a preselected time in the molding cycle, the gate valves are opened, and the mixture of molten plastic and gas flows from the accumulating zone into the empty mold through the gate valves at the entrance to the mold. The mold is provided with gas vents, so that the air displaced by the incoming plastic is readily removed as the waves of plastic approach each other and merge. The bathtub being molded is a giant article requiring a plurality of conduits having a cross sectional area greater than 100 square centimeters. As the plastic flows to portions of the mold remote from the conduits sensors on the contoured wall of the mold detect the arrival of the hot plastic. The sensors detect the increase in pressure attributable to the presence of the hot plastic, which pressure is significantly greater than the brief surge of pressure attributable to the ventward flow of the air displaced by the plastic. As soon as sensors confirms the arrival of the hot plastic at each of the several preselected positions in the mold, the signal is given which actuates the closing of the gate valves of the several conduits. Thus the quantity of mixture which flows into the mold is responsive to that necessary for filling the mold and is not controlled by a volumetric regulator of shot-size within the molding machine. When different types of inserts are positioned in the mold, thus changing the required volume of the plastic, there are no readjustments of the molding machine by reason of the self-regulating function of the sensors. Moreover, in molding a series of uniform articles, the variation in the weight of various articles resulting from the control by the pressure sensors in the mold is less than the variation in weight resulting from volumetric control of shot-size for giant articles such as a bathtub.

EXAMPLE 2

Four heated conduits, each having a cross sectional area of about 100 square centimeters, are connected with a mold for a three passenger boat, said mold having gas vents for the displaced air and having six strain guages providing electrical signals, the pressure sensors (strain gauges) being located at positions remote from the entrances to zones at which the plastic flows from the conduits. In the molding apparatus, a batch of nylon pellets is plasticized and melted, and whipped into a froth by carbon dioxide maintained at about three atmospheres pressure and adapted to provide a gas cell volume at ambient conditions of about 50%. Two accumulating zones are provided so that the froth can be advanced to the accumulating zones continuously, and so that during the period when an accumulating zone is being partially emptied, the other is being filled. After the mold is ready, the gate valves at the entrance to the mold are opened, and the mixture of nylon and carbon dioxide flows into the mold. The gas initially in the mold is displaced and escapes through vents. The hot nylon flows into all portions of the mold, and as soon as all of the sensors establish that the molten plastic has flowed to each of the positions, a signal is sent which actuates the power device for closing all of the gate valves for the conduits. The mold is then cooled, and the boat is removed therefrom. The pressure of the plastic and gas in the hot filled mold is about 2 atmospheres, so that after cooling to ambient temperature, the pressure is about 1 atmosphere, whereby the contraction of the gas upon cooling does not cause any shrinkage of the article.

EXAMPLE 3

An interior door suitable for use in an entrance to an office is provided with metal inserts. Production specifications for the inserts differ from day to day by reason of the varying requirements of builders. The volume of the inserts also vary. The mold is so designed to permit such variation in the type of metal inserts. The mold is provided with two conduits, each having a cross section of about 100 square centimeters. At each of the four corners of the mold, strain gauge type of pressure transducers are positioned. A mixture of polystyrene and propane is whipped into a froth at about three atmospheres pressure, and maintained temporarily in heated accumulating zones and heated conduits. Then the valves are opened, and the mixture of molten polystyrene and propane flows into the mold. As soon as the pressure sensors detect that the mold is completely filled, the signal is given to actuate the power device for the gate valves to shut off any futher flow of the mixture into the mold. Water cooled conduits on the rear of the contoured walls of the mold bring about more rapid cooling of the door to ambient temperature. As the temperature approaches ambient temperature, the gas pressure also approaches ambient pressure, so that the door does not either collapse or swell when removed from the mold.

Various modifications of the invention are possible without departing from the scope of the claimed invention.

The invention claimed is:

1. In the method of converting a mixture of an organic thermoplastic and gas to a cellular plastic article in which said organic thermoplastic is heated to provide molten plastic, in which gas cells are distributed throughout the molten plastic to provide a mixture of molten plastic and gas, in which a mixture of molten plastic and gas is injected at superatmospheric pressure into a mold, in which the mold is cooled to cool the mixture of molten plastic and gas to thereby form a cellular plastic article, in which a cellular plastic article is removed from the cooled mold, the improvement which includes the steps of:

directing a mixture of gas and molten thermoplastic selected from the group consisting of polyethylene, nylon, and polystyrene, into a heated accumulating zone for temporary storage at a superatmospheric pressure less than about 5 atmospheres, said gas being selected from the group consisting of trifluorochloromethane, carbon dioxide, and propane;

providing at least two heated conduits from said accumulating zone to a mold for a giant article, each conduit having a cross sectional area of at least 100 square centimeters, each said conduit being controllable at the entrance to a mold for flow or no flow;

initiating the flow of mixture of molten organic plastic and gas from said accumulating zone through the conduits into the mold, thereby displacing the gas at about atmospheric pressure from the mold through vents and expanding the mixture of molten organic plastic and gas;

sensing the arrival of expanded mixture of hot molten plastic and gas at each of at least four positions in the mold remote from the inlets from the said conduits;

providing a signal only when the mold is filled as indicated by the arrival of the mixture of hot molten plastic and gas at each of the plurality of sensing positions in the mold; and utilizing said signal instantly to terminate the flow of mixture of molten plastic and gas into the mold, whereby the low pressure injection molding is responsive to the filling of the mold with cellular plastic from said accumulating zone maintained at a pressure less than five atmospheres.

* * * * *